Feb. 9, 1960 F. L. HAUSHALTER 2,924,490
TRACK SHOE WITH RESILIENT CUSHION INSERT
Original Filed Jan. 15, 1957 3 Sheets-Sheet 1

INVENTOR.
FRED L. HAUSHALTER
BY
ATTORNEYS

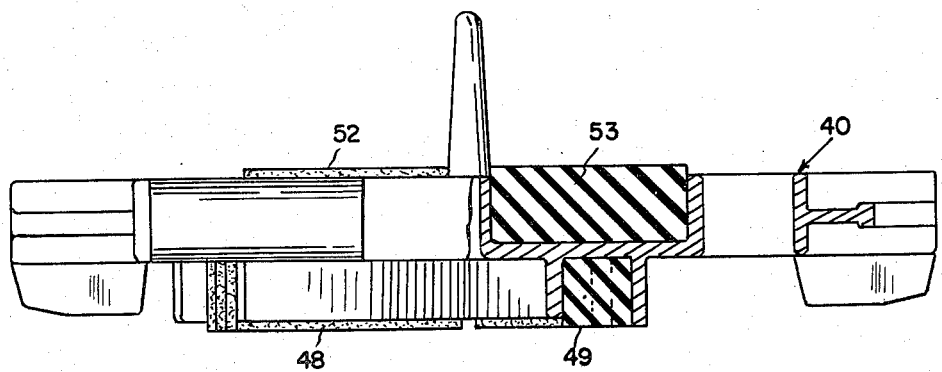
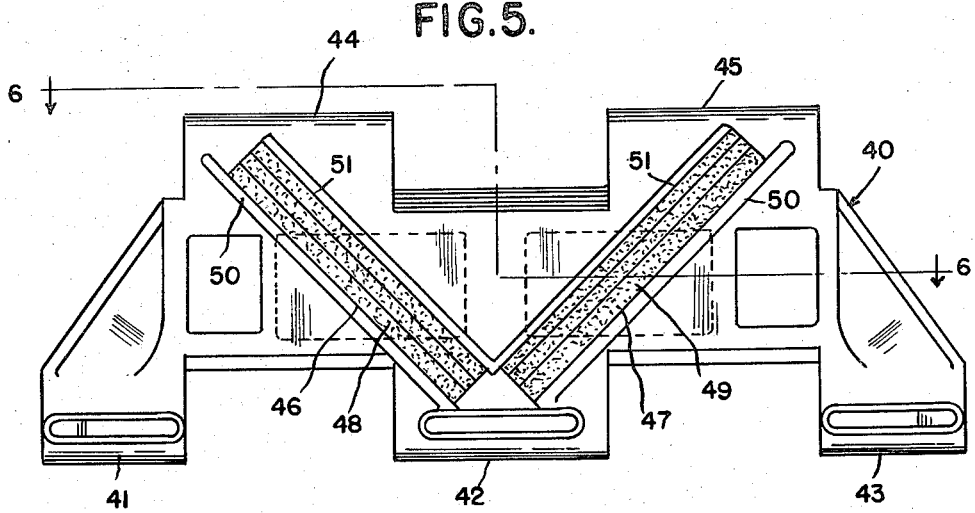

Feb. 9, 1960    F. L. HAUSHALTER    2,924,490
TRACK SHOE WITH RESILIENT CUSHION INSERT
Original Filed Jan. 15, 1957    3 Sheets-Sheet 3
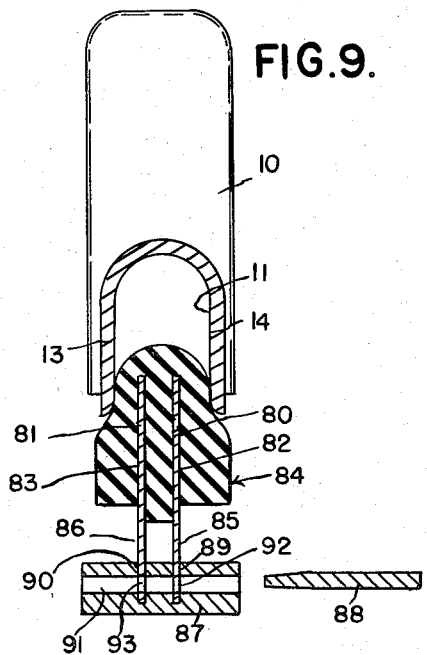
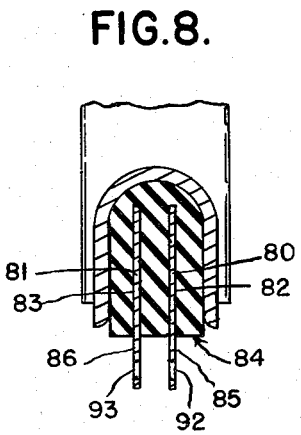
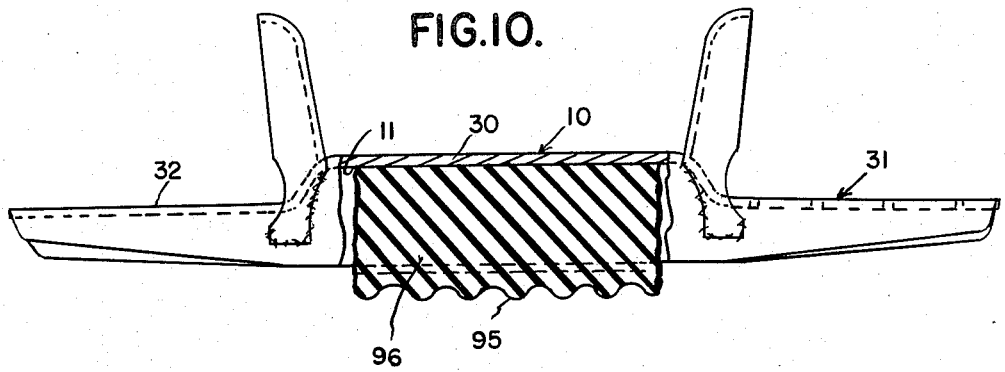
INVENTOR.
FRED L. HAUSHALTER
BY
ATTORNEYS

United States Patent Office 2,924,490
Patented Feb. 9, 1960

2,924,490

TRACK SHOE WITH RESILIENT CUSHION INSERT

Fred L. Haushalter, Pontiac, Mich.

Original application January 15, 1957, Serial No. 634,221. Divided and this application January 27, 1958, Serial No. 711,322

15 Claims. (Cl. 305—38)

This invention relates generally to resilient cushion inserts, and constitutes a division of my application Serial No. 634,221 filed January 15, 1957.

One of the essential objects of the invention is to provide a stressed insert of resilient rubber-like material within and projecting outwardly from a recess in a rigid member, such as a track shoe for an endless track type tractor to serve as a ground engaging traction member.

Another object is to provide an insert of the type mentioned that originally had a width greater than the distance between opposite side walls of the recess and that is stretched into said recess in a direction transverse to the width thereof, whereby said stretched insert, when released, is under sufficient compression between and in frictional surface to surface engagement with opposite side walls of said recess to be retained permanently in said recess without vulcanization.

Another object is to provide an insert of the type mentioned wherein one or more rigid elements originally employed to stretch the insert into the recess are left permanently in and have portions that project outwardly from said insert to serve as cooperating ground engaging members that are especially useful as traction elements in soft ground, mud, snow and the like.

Another object is to provide a construction wherein the insert has one or more preformed outwardly opening slots for the reception of the rigid elements mentioned, and wherein the outwardly projecting portions of said rigid elements are adapted to be engaged by a separate cross bar capable of being detachably locked by a removable pin to said portions, whereby said rigid elements and cross bar collectively may be employed as a thrust or pressure exerting means to stretch the insert into the recess.

Another object is to provide a track shoe structure that is simple in construction, economical to manufacture and efficient in operation.

Other objects, advantages and novel details of construction of this invention will be made more apparent as this description proceeds, especially when considered in connection with the accompanying drawings wherein:

Fig. 5 is a bottom plan view of a modified form of track shoe containing a pair of resilient inserts arranged in V formation.

Fig. 6 is a vertical sectional view taken substantially on the line 6—6 of Fig. 5.

Fig. 8 is a cross sectional view similar to Fig. 7 but showing another modification.

Fig. 9 is a view similar to Fig. 3, but showing in section a modified form of pressure exerting means wherein the plate-like elements are similar to those in Fig. 8; wherein the cross bar is removable from said plate-like elements, and wherein the attaching pin for the cross bar is shown separated from both the cross bar and the plate-like elements.

Fig. 10 is a view similar to Fig. 4 but showing another modification.

Figure 2:
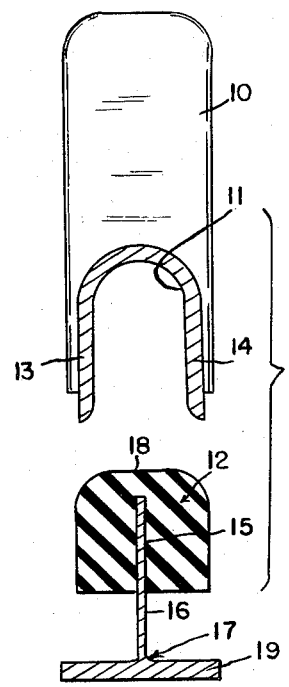
Fig. 2 is a cross sectional view through the track shoe and through the insert and pressure exerting member, before the insert is stretched into the channel-shaped recess in the track shoe.

In the drawings, 10 is a rigid member, such as a track bar or track shoe for an endless track type tractor, having a downwardly opening channel-shaped recess 11 containing an elongated outwardly projecting stressed insert 12 of resilient rubber-like material adapted to serve as a ground engaging traction member. Originally, the insert 12 had a width greater than the distance between opposite side walls 13 and 14 respectively of the recess 11, as illustrated in Fig. 2, and such insert also had a preformed outwardly opening relatively thin preformed slot 15 for the reception of a correspondingly thin plate-like portion 16 of a substantially T-shaped rigid thrust or pressure exerting member 17 by which the insert 12 is stretched into the recess 11. Preferably, the slot 15 extended in depth from the rear surface of the insert 12 to within a short distance of its forward surface 18. If desired, the forward surface 18 of the insert may be rounded, as illustrated in Fig. 2, to facilitate the insertion of the insert 12 into the recess 11.

When forward pressure is applied to the cross bar 19 of the pressure member 17, the insert 12 is forced edgewise into the recess 11, and such pressure stretches said insert 12 in a direction transverse to the width of the recess 11. Hence the width of said stretched insert is reduced, and said insert is under stress between and in frictional surface to surface engagement with opposite side walls 13 and 14 respectively of said recess. The plate-like portion 16 of the pressure member 17 is then withdrawn from the slot 15, whereupon the contraction of the resilient material of the insert 12 will close the slot 15. As a result the insert 12 will be retained permanently in said recess 11 without vulcanization.

Figure 3:
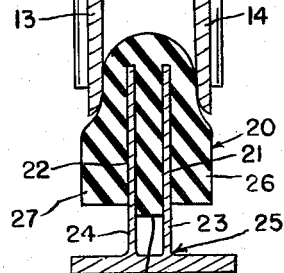
Fig. 3 is a cross sectional view through a modification wherein a pair of plate-like rigid portions of the pressure exerting member are within spaced slots in the insert, and the latter is partially stretched into the channel-shaped recess in the track shoe.

In Fig. 3 I have illustrated a modification wherein the insert 20 has a pair of spaced preformed outwardly opening slots 21 and 22 respectively in the central portion thereof for the reception of a pair of spaced thin plate-like portions 23 and 24 respectively of a substantially T-shaped rigid thrust or pressure exerting member 25. This will provide a more stable construction than that illustrated in Fig. 2 for stretching the insert 20 edgewise into the recess 11. When the spaced portions 23 and 24 of the pressure member 25 are withdrawn from the slots 21 and 22, the contraction of the resilient material of the insert 20 will close the slots 21 and 22.

Figure 1:
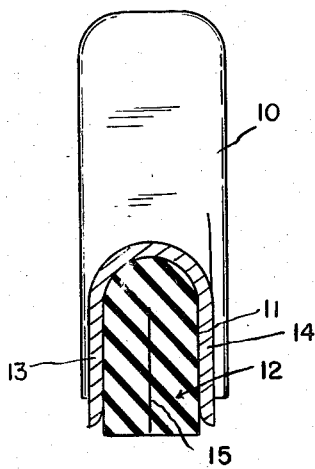
Fig. 1 is a cross sectional view taken substantially on the line 1—1 of Fig. 4.

In Figs. 1 to 3 inclusive the contraction required for closing the slots in the resilient insert is less than the total stretching during insertion, so that in each instance the insert is still under stress tending to expand the same transversely after the pressure exerting member is withdrawn. This will insure sufficient frictional surface to surface engagement between the insert and opposite side walls of the recess to retain the insert permanently in the recess without vulcanization.

As the pressure of the member 25 is applied to the insert 20 at the central portion thereof, the outer side portions 26 and 27 respectively of the insert 20 are retarded by frictional engagement with the opposite side walls 13 and 14 of the recess 11. Hence the central portion of the insert 20 will be advanced to a greater degree than the outer side portions 26 and 27 thereof. This could cause the rear surface of the insert to be objectionably concaved when insertion is completed. To avoid this, I have provided an insert wherein the center portion 28 thereof between the spaced slots 21 and 22 initially projects rearwardly beyond the outer side portions 26 and 27 of the insert. Thus, during insertion the friction of the spaced portions 23 and 24 of the pressure exerting member 25 on the rearwardly projecting center portion 28 of the insert will draw said rearwardly projecting center portion 28 inwardly so that its rear surface will be substantially flush with the rear surfaces of the outer side portions 26 and 27 when insertion is completed.

Figure 4:
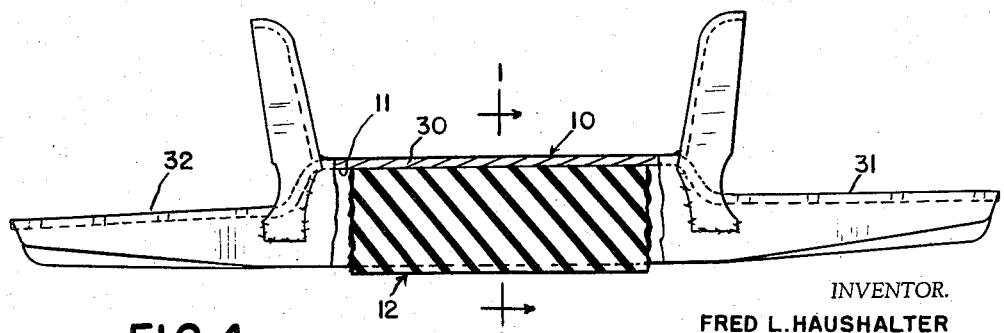
Fig. 4 is an elevational view of a track bar or track shoe embodying my invention with parts broken away and in section.

As shown in Fig. 4, the track bar or track shoe 10 of an endless track type tractor is provided throughout its length with the downwardly opening channel-shaped recess 11, but the vertical depth of the central portion 30 of the recess is greater than the vertical depth thereof at opposite end portions 31 and 32. The insert 12 extends the full length of the recess 11 and is fashioned to correspond in depth to the respective portions 30, 31 and 32 thereof. Such insert 12 may be provided with a single preformed outwardly opening slot such as 15 in Figs. 1 and 2 for the reception of a single plate-like portion of a rigid thrust or pressure exerting member such as 17, or may be provided with spaced preformed outwardly opening slots such as 21 and 22 in Fig. 3 for the reception of a pair of spaced plate-like portions 23 and 24 of a rigid thrust or pressure exerting member, such as 25 in Fig. 3, whereby such insert may be stretched edgewise into the recess as above described. When the pressure member is withdrawn, the slot or slots, as the case may be, will be closed by contraction of the insert, and the latter will be retained permanently in the recess without vulcanization.

In Figs. 5 and 6 I have illustrated a modification wherein a track bar or track shoe 40 has spaced lugs 41, 42 and 43 respectively at one edge thereof and has spaced lugs 44 and 45 at the opposite edge thereof for pivotal connection with mating lugs of adjacent corresponding track bars or track shoes (not shown). On the underside of the track bar or track shoe 40 are two downwardly opening channel-shaped recesses 46 and 47 arranged in V formation and containing outwardly projecting inserts 48 and 49 respectively of resilient material that serve as ground engaging traction members. These recesses 46 and 47 can be formed in the original casting or by spaced bars 50 and 51 welded to the casting. The inserts 48 and 49 are inserted edgewise into the recesses 46 and 47 and are permanently retained therein without vulcanization, as aforesaid. If desired, similar inserts such as 52 and 53 respectively may be stretched into channel-shaped recesses in the top of the track bar or track shoe.

Figure 7:
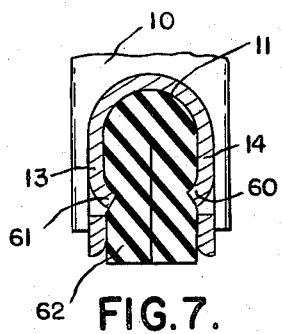
Fig. 7 is a cross sectional view similar to Fig. 1, showing the shoe broken away, and showing a modified construction.

In Fig. 7 I have illustrated another modification wherein opposite side walls 13 and 14 respectively of the downwardly opening recess 11 in the track shoe 10 are provided with inwardly projecting lugs 60 and 61 respectively which are embedded in opposite sides of the outwardly projecting resilient insert 62. One or more such lugs may be struck from either or both side walls 13 and 14 of the recess 11 after the insert 62 has been fully advanced edgewise into the recess to serve as additional anchorage means for the insert.

As thus far described the rigid thrust or pressure exerting members used for stretching the inserts into the recesses are later withdrawn from the slots in the inserts, and the slots in such inserts are then closed by contraction of the resilient material of the inserts.

In Figs. 8 and 9 I have illustrated another modification wherein one or more plate-like elements originally employed to stretch the insert edgewise into the recess are left permanently in and have portions that project outwardly from the insert to serve as cooperating ground engaging members that are especially useful as traction elements in soft ground, mud, snow or the like.

As shown in Figs. 8 and 9, a pair of spaced relatively thin plate-like rigid elements 80 and 81 respectively engage preformed outwardly opening spaced slots 82 and 83 respectively in the central portion of an insert 84 of resilient material (corresponding to the insert 20 in Fig. 3) and have spaced substantially parallel portions 85 and 86 respectively that project outwardly from the insert 84. Initially the portions 85 and 86 of said rigid elements 80 and 81 are engaged by a separate cross bar 87, and the latter is detachably locked by a removable pin 88 to said portions 85 and 86, whereby said cross bar 87 and rigid elements 80 and 81 collectively may be employed as a thrust or pressure exerting member to stretch the insert 84 edgewise, as previously described, into the downwardly opening channel-shaped recess 11 in the track bar or track shoe 10 for an endless track type tractor.

Preferably the removable cross bar 87 is provided intermediate its ends with spaced slots 89 and 90 for receiving the outwardly projecting portions 85 and 86 or the rigid elements 80 and 81, and is provided lengthwise thereof with an opening 91 adapted to register with openings 92 and 93 in the outwardly projecting portions 85 and 86 of the rigid elements 80 and 81. The removable pin 88 engages the registering openings 90, 92 and 93 respectively in the cross bar and outwardly projecting portions 85 and 86 to detachably lock the cross bar 87 to said outwardly projecting portions 85 and 86. Consequently, the outwardly projecting portions 85 and 86 of the rigid elements 80 and 81 perform a dual function; first as a part of the thrust or pressure exerting means and second as traction elements.

After the insert 84 has been stretched edgewise into the recess 11 as aforesaid, then both the cross bar 87 and pin 88 are removed or detached from the rigid elements 80 and 81 so that the outwardly projecting portions 85 and 86 of said rigid elements may serve as cooperating ground engaging members for use as traction elements in soft ground, mud, snow and the like. Also, such projecting portions 85 and 86 of the rigid elements 80 and 81 may be useful for propelling amphibious vehicles through water.

When the rigid elements 80 and 81 are left permanently in the insert 84 they are preferably formed of tempered or hardened metal. Also, it is to be noted that there is no contraction of the resilient material of the insert 84 in Figs. 8 and 9 because the rigid elements 80 and 81 are not withdrawn. Hence, the insert 84 is more securely anchored or retained permanently in the recess 11, because such insert 84 is under greater stress between and is in tighter frictional surface to surface engagement with opposite side walls 13 and 14 of the recess 11.

In Fig. 10 I have illustrated a construction similar to that illustrated in Fig. 4, except that the outer surface 95 of the outwardly projecting insert 96 is corrugated to provide better traction.

What I claim as my invention is:

1. A track shoe for an endless track type tractor comprising a rigid member having a downwardly opening recess therein, and an insert of resilient material having a compressed portion within said recess and having the remaining portion thereof outside said recess to serve as a ground engaging traction member, said stressed portion of said insert originally having a width greater than the distance between opposite side walls of said recess and being stretched into said recess in a direction transverse to the width thereof whereby said portion of said insert is under sufficient compression between and in frictional surface to surface engagement with opposite side walls of said recess to be retained permanently in said recess without vulcanization, the means for stretching said insert into said recess including a rigid element permanently anchored within and having a portion projecting outwardly from said insert to serve as a cooperating ground engaging traction member.

2. A track shoe for an endless track type tractor comprising a rigid member having a downwardly opening recess therein, and an insert of resilient material having a compressed portion within said recess and having the remaining portion thereof outside said recess to serve as a ground engaging traction member, said stressed portion of said insert originally having a width greater than the distance between opposite side walls of said recess and being stretched into said recess in a direction transverse to the width thereof whereby said portion of said insert is under sufficient compression between and in frictional surface to surface engagement with opposite side walls of said recess to be retained permanently in said recess without vulcanization, the means for stretching said insert into said recess including a rigid plate-like element permanently anchored within and having a portion projecting outwardly from said insert to serve as a cooperating ground engaging traction member.

3. A track shoe for an endless track type tractor comprising a rigid member having a downwardly opening recess therein, and an insert of resilient material having a compressed portion within said recess and having the remaining portion thereof outside said recess to serve as a ground engaging traction member, said stressed portion of said insert originally having a width greater than the distance between opposite side walls of said recess and being stretched into said recess in a direction transverse to the width thereof whereby said portion of said insert is under sufficient compression between and in frictional surface to surface engagement with opposite side walls of said recess to be retained permanently in said recess without vulcanization, the means for stretching said insert into said recess including a pair of spaced rigid elements permanently anchored within and having spaced portions projecting outwardly from said insert to serve as cooperating ground engaging traction members.

4. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a rigid element permanently anchored within and having a portion projecting outwardly from said insert to serve as a cooperating ground engaging traction member.

5. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a pair of spaced rigid elements permanently anchored within and having spaced portions projecting outwardly from said insert to serve as cooperating ground engaging traction members.

6. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a plate-like rigid element permanently anchored within and having a portion projecting outwardly from said insert to serve as a cooperating ground engaging traction member.

7. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a rigid element permanently anchored within and having a portion projecting outwardly from said insert to serve as a cooperating ground engaging traction member, said outwardly projecting portion of said rigid element having an opening through which a locking pin is inserted to detachably connect a separate removable cross bar to said rigid element, whereby said cross bar and rigid element collectively constitute the means by which said insert is stretched into said recess.

8. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a pair of spaced rigid elements permanently anchored within and having spaced portions projecting outwardly from said insert to serve as cooperating ground engaging traction members, said spaced outwardly projecting portions of said rigid elements having aligned openings through which a removable locking pin is inserted to detachably connect a separate removable cross bar to said rigid elements, whereby said cross bar and rigid elements collectively constitute the means by which said insert is stretched into said recess.

9. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a rigid element permanently anchored within and having a portion projecting outwardly from said insert to serve as a cooperating ground engaging traction member, said outwardly projecting portion of said rigid element having means by which a separate removable cross bar is detachably connected by a removable element to said rigid element, whereby said cross bar and rigid element collectively constitute the means by which said insert is stretched into said recess.

10. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a single means for stretching said insert into said recess and forming with said insert means for increasing the traction of the outwardly projecting portion of said insert.

11. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a single means for stretching said insert into said recess and for increasing the traction of the outwardly projecting portion of said insert, including a rigid element having a portion permanently anchored within said insert.

12. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and a single means for stretching said insert into said recess and for increasing the traction of the outwardly projecting portion of said insert, including spaced rigid elements having portions permanently anchored within said insert.

13. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and rigid means permanently anchored within and having spaced portions projecting outwardly from said insert to serve as cooperating ground engaging traction members.

14. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and rigid means permanently anchored within and having spaced portions projecting outwardly from said insert to serve as cooperating ground engaging members, said spaced outwardly projecting portions of said rigid means having aligned openings through which a removable element is inserted to detachably connect a separate cross bar to said rigid means whereby said cross bar and rigid means collectively are operable to stretch said insert into said recess.

15. A track shoe for an endless track type tractor comprising a rigid member having a downwardly opening recess therein, a compressed insert of resilient material within said recess and having a portion projecting outwardly from said recess to serve as a ground engaging traction member, said insert originally having a width greater than the distance between opposite side walls of said recess and being stretched into said recess in a direction transverse to the width thereof whereby said insert is under sufficient compression between and in frictional surface to surface engagement with opposite side walls of said recess to be retained permanently in said recess without vulcanization, and rigid means permanently anchored within and having a portion projecting outwardly from said insert to serve as a cooperating ground engaging traction member, said outwardly projecting portion of said rigid element having means by which a separate removable cross bar is detachably connected by a removable element to said rigid means, whereby said cross bar and rigid means collectively are operable to stretch said insert into said recess.

References Cited in the file of this patent

UNITED STATES PATENTS

| 1,279,386 | McEvoy | Sept. 17, 1918 |
| 1,947,474 | Knox | Feb. 20, 1934 |
| 2,064,890 | Dorst | Dec. 22, 1936 |
| 2,312,072 | Broadwater | Feb. 23, 1943 |
| 2,686,697 | Baker | Aug. 17, 1954 |
| 2,753,886 | Powers | July 10, 1956 |

FOREIGN PATENTS

| 148,625 | Sweden | Jan. 25, 1955 |